Oct. 23, 1951 J. C. HUETT 2,572,342
AIRCRAFT MUDGUARD
Filed Sept. 3, 1946

JAMES C. HUETT
INVENTOR.

BY

ATTORNEY

Patented Oct. 23, 1951

2,572,342

UNITED STATES PATENT OFFICE 2,572,342

AIRCRAFT MUDGUARD

James C. Huett, Dallas, Tex.

Application September 3, 1946, Serial No. 694,639

1 Claim. (Cl. 244—100)

This invention relates to aircraft and more especially to mud guards for the landing wheels thereof.

The landing wheels of airplanes are conventionally provided with wheel pants whose function primarily is to prevent the throwing of dirt and mud in the general direction of the propeller of the aircraft but for the most part, these wheel pants, especially in lighter aircraft, tend toward the accumulation of mud between the said wheel pants and the tread of the landing wheel, which, in many cases restricts the wheels and at comparatively high landing speed, this results in nose overs, thereby endangering the lives of the passengers. Inasmuch as these conventional wheel pants enclose the greater part of the upper surface of the wheel, the tendency to collect mud or clay is greater and by the same reasoning the friction imposed on the wheel is greater and the resultant landing hazard, especially in cases of the lighter aircraft, are increased.

The principal object of the present invention therefore is to provide a mud guard and a mounting therefor for supporting the mud guard well above the landing wheel yet in such relationship thereto that it will be equally as effective to shield the propeller as the conventional type of wheel pants which embraces the upper portion of the wheel. In elevating the mud guard above the top of the wheel, there is little likelihood that mud or clay will accumulate thereunder, at least to the extent that rotation of the wheel will be materially restricted. Moreover, since the invention is primarily designed as a mud guard and mounting for the wheels of aircraft unequipped with retractible landing gear, the relative spacing of the mud guard and wheel affords unrestricted passage of air and therefore presents no resistance to air in flight.

Another object of the invention is to provide a special mounting for the mud guard of airplane wheels in which provision is made through the medium of suitable bracing, to prevent displacement of the mud guard which might otherwise be caused by vibration, wind pressure, landing shocks and the like. Furthermore, structural simplicity, ease of mounting and removal and the symmetrical appearance of the guard and mounting are considered novel features of the present invention.

With the foregoing and other objects in view the invention has further reference to certain features of accomplishment which will become apparent as the description proceeds, taken in connection with the accompanying drawing wherein.

Figure 1:
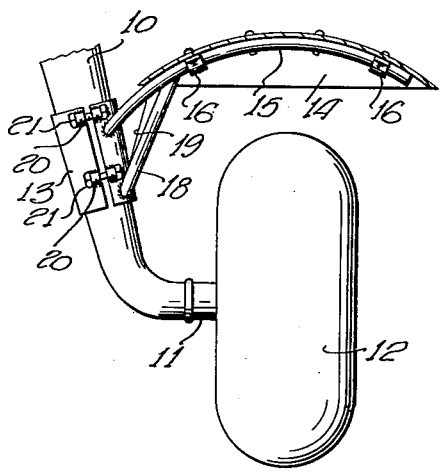
Figure 1 is a front elevational view of an airplane landing wheel, showing the landing strut fragmentarily to illustrate the mud guard mounting and mud guard of the present invention, the latter being shown in transverse section.
Figure 2:
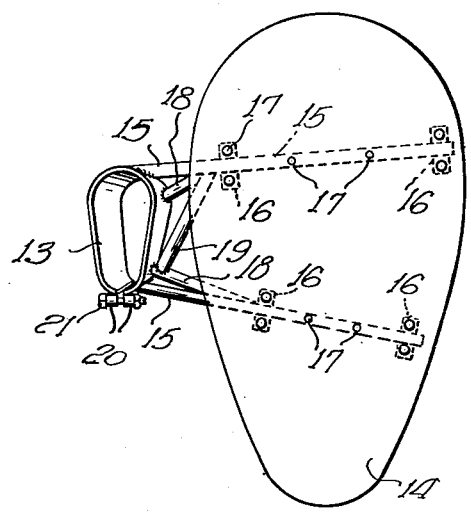
Figure 2 is a plan view of the mud guard and mounting.

Continuing with a more detailed description of the drawing, reference is primarily made to Figures 1 and 2 in which numeral 10 denotes the landing strut of an airplane, partially broken away and whose axle 11 carries the landing wheel 12. The landing strut 10 is of conventional cross-sectional shape, that is, of streamlined form, hence the correspondingly shaped collar 13, which embraces this strut and which constitutes the part of the mud guard mounting to be described and which is a part of the present invention.

A mud guard 14 is provided and is of substantially egg-shape as well as being concavo-convex in longitudinal and transverse cross-section. To support the mud guard 14, there are provided a pair of curved arms 15, which are attached by welding or otherwise, to one end or the top of the collar 13 and extend outwardly over the landing wheel 12. These arms are convergent adjacent their fixed ends and the curvature thereof corresponds to that of the mud guard 14 which overlies the arms and is connected thereto by means of clips 16 and rivets 17. Angular braces 18 have their lower ends welded or otherwise secured to the lower end of the collar 13 and extend upwardly and are secured to the arms 15 at a point spaced outwardly from their fixed ends. A third brace 19 is obliquely situated between the braces 18, as shown in Figure 2, one end being joined to the lower end of a brace 18 whlie the upper end thereof is joined to the companion brace 18 adjacent its top. By so disposing the brace 19, the torque which may be imposed on the angular brace 18 by wind pressure exerted on the mud guard 14 is absorbed and metal fatigue, due to vibration of the mud guard is minimized. The collar 13 is longitudinally split at the trailing edge and is provided with threaded ears 20 to receive bolts 21 which are adapted to secure the collar 13 in position on the landing strut 10.

Figure 3:
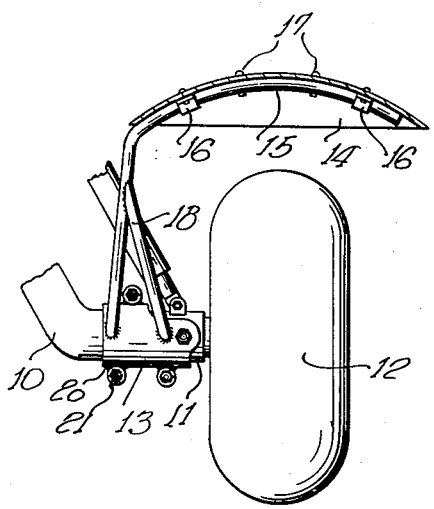
Figure 3 is a view similar to Figure 1 but showing a slightly modified form of mounting for the mud guard.
Figure 4:
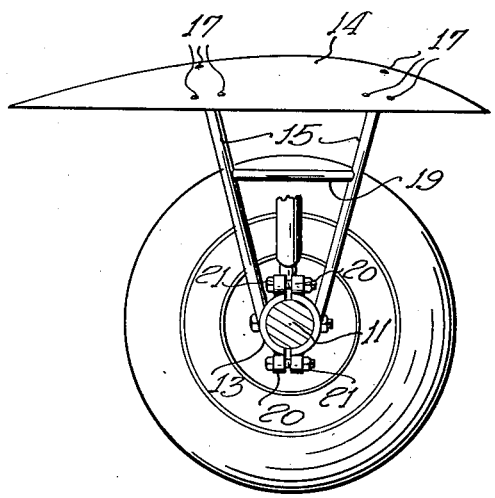
Figure 4 is a side elevational view of the modified form of the invention as viewed from the inside of the wheel.

Referring now to Figures 3 and 4, the same characters of reference will be employed to denote parts in the modified form of the invention corresponding to those in the form just described. It will be observed that the only differences between the structure first described and that shown in Figures 3 and 4 resides in the fact that the collar 13 of the mud guard mounting is disposed on the axle portion of the landing strut 10 and is composed of semi-cylindrical sections and further, that the arcuate arms 15 which support the mud guard 14 are elongated in order to compensate for the different relative spacing between the mud guard 14 and the mounting collar 13. However, the same principle is carried out in that the arms 15 are joined to one end of the collar 13 while the angular braces 18 are joined to the opposite end of the collar and extend upwardly and are connected to the arms 15 in a manner not unlike that earlier described. The intermediate brace 19 in the modified form, instead of being in oblique relation to the angular braces 18, is in parallel relation to the longitudinal axis of the mud guard 14. However, it serves the same function as the oblique brace 19 shown in Figures 1 and 2 in that it minimizes the effect of torque imposed on the supporting arm 15 caused by wind pressure on the mud guard 14. The structural variation shown in Figures 3 and 4 is necessary in order to accommodate the invention to the landing gear of aircraft of different design. However, the main objects obtain in that the mud guard 14 is so positioned in relation to the landing wheel 12 that when landing an airplane on soft earth or clay, there will be sufficient clearance between the mud guard 14 and the landing wheel to allow mud or clay to pass freely and will not accumulate under the mud guard to offer resistance to the landing wheel, resulting possibly in overturning the plane, injuring the passengers and causing damage to the plane itself. It will be observed that as a further precaution against collecting mud or clay under the mud guard 14, the bracing elements are set well inwardly from the tread of the landing wheel, which fact further precludes any restriction to free passage of air between the mud guard 14 and the landing wheel which would otherwise retard the speed of a plane.

Manifestly, the construction as shown and described is capable of some modification and such modification as may be construed to fall within the scope and meaning of the appended claim is also considered to be within the spirit and intent of the invention.

What is claimed is:

In combination with the landing strut and wheel of an aircraft, a split collar embracing said landing strut, a pair of arcuated, divergent arms affixed to one end of said collar and extending over the wheel of the aircraft, angular braces secured to the opposite end of said collar and whose upper ends are joined to said arcuated arms, a mud guard consisting of a concavo-convex, shallow body of greater length than width and means for securing said body to said arcuated arms whereby the lower edge of said mud guard will be disposed entirely above said wheel.

JAMES C. HUETT.

REFERENCES CITED

The following references are of record in the file of this patent:

UNITED STATES PATENTS

| Number | Name | Date |
|---|---|---|
| 534,868 | Elder | Feb. 26, 1895 |
| 691,445 | Cochrane | Jan. 21, 1902 |
| 1,341,202 | Strand | May 25, 1920 |
| 1,395,449 | Mowry | Nov. 1, 1921 |
| 1,446,531 | Williams | Feb. 27, 1923 |
| 1,531,588 | Williams | Mar. 31, 1925 |
| 1,810,054 | Miller | June 16, 1931 |
| 1,834,427 | Schumacher | Dec. 1, 1931 |
| 2,487,405 | Andrews | Nov. 8, 1949 |